(12) United States Patent
Murase

(10) Patent No.: US 7,428,614 B2
(45) Date of Patent: Sep. 23, 2008

(54) MANAGEMENT SYSTEM FOR A VIRTUALIZED STORAGE ENVIRONMENT

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 11/493,530

(22) Filed: Jul. 27, 2006

(65) Prior Publication Data

US 2008/0028143 A1    Jan. 31, 2008

(51) Int. Cl.
*G06F 12/00* (2006.01)
(52) U.S. Cl. .................. 711/114; 711/154; 718/105
(58) Field of Classification Search ............... 711/112, 711/114, 154; 718/105
See application file for complete search history.

(56) References Cited

U.S. PATENT DOCUMENTS

| | | | |
|---|---|---|---|
| 6,606,690 B2 * | 8/2003 | Padovano | 711/148 |
| 7,269,696 B2 * | 9/2007 | Muhlestein et al. | 711/147 |
| 2003/0221077 A1 | 11/2003 | Ohno et al. | |
| 2005/0193167 A1 | 9/2005 | Eguchi et al. | |
| 2005/0198401 A1 * | 9/2005 | Chron et al. | 709/250 |
| 2005/0289308 A1 | 12/2005 | Kano | |

OTHER PUBLICATIONS

Perumalla, et al., "Performance Prediction of Large-Scale Parallel Discrete Event Models of Physical Systems", © 2005, Winter Simulation Conference, p. 356-364.*

* cited by examiner

*Primary Examiner*—Brian R Peugh
(74) *Attorney, Agent, or Firm*—Mattingly, Stanger, Malur & Brundidge, P.C.

(57) ABSTRACT

In a method to automate configuration of a storage virtualized environment in a system that includes one or more storage systems having array groups and one or more storage virtualizers, a management terminal selects an array group that is able to meet specifications for allocating a logical volume. The management terminal requests that the volume be allocated in the selected array group on a selected storage system. The management terminal determines the storage virtualizer that meets predetermined criteria, such as having the lightest workload, and selects an appropriate virtualizer. The management terminal requests that a virtual volume be created on the selected virtualizer, with the virtual volume mapping to the newly-allocated logical volume on the storage system and to one or more specified client hosts.

20 Claims, 6 Drawing Sheets

Process to Allocate Storage Volume

| StorageSystemID | ArrayGroupID | RAID Level | ... | FreeSpace |
|---|---|---|---|---|
| 100-1 | 1 | RAID 0 | ... | 8,150,238,732,578 |
| 100-1 | 2 | RAID 5 | ... | 1,951,941,234,190 |
| 100-2 | A | RAID 0 | ... | 5,851,734,588,103 |
| ... | ... | ... | ... | ... |

FIG. 3 Data Structure of Storage System Profile Table

| VirtualizerID | Average Workload |
|---|---|
| Virtualizer120-1 | X |
| Virtualizer120-2 | Y |
| ... | ... |

FIG. 4 Data Structure of Virtualizer Profile Table

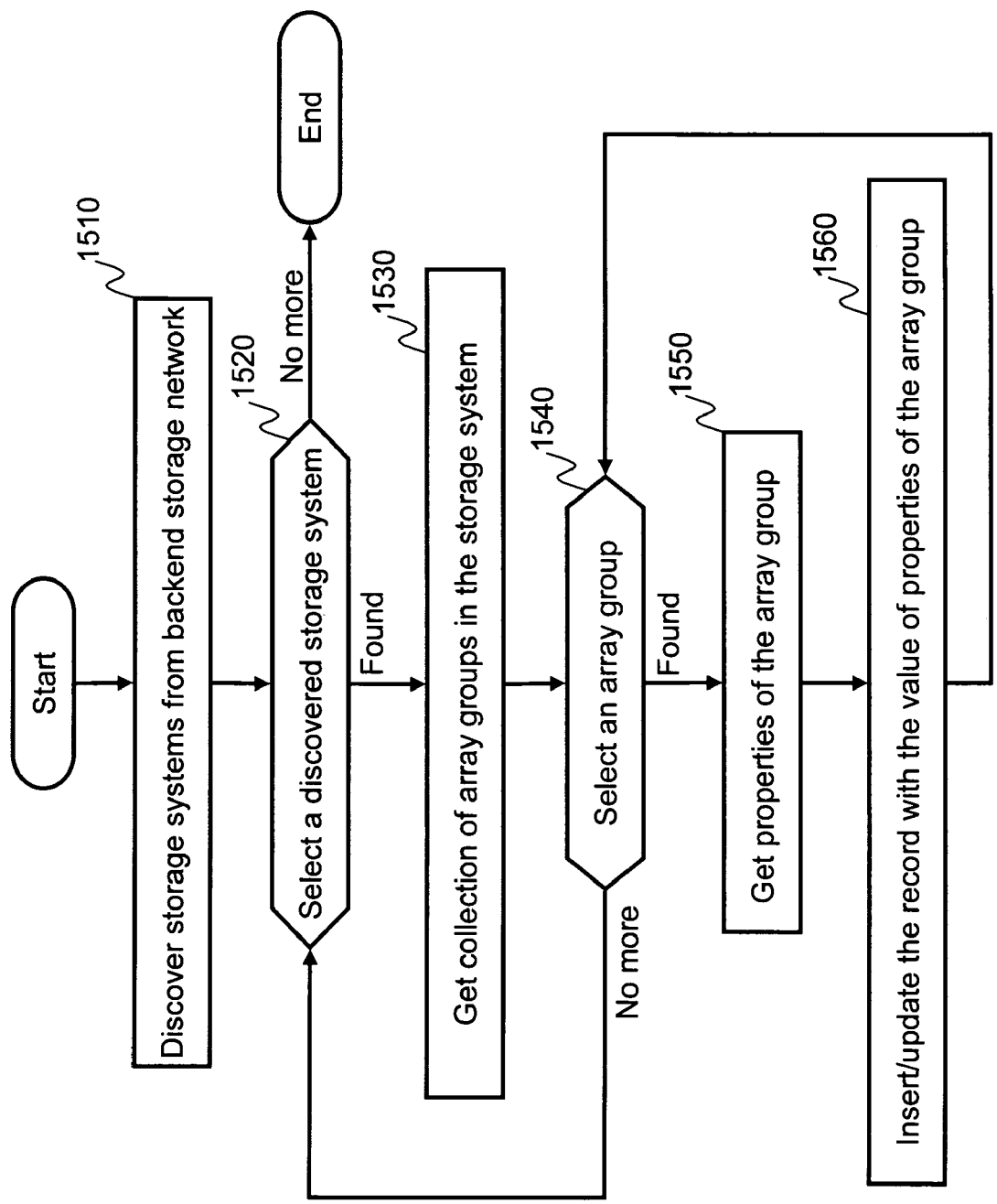
FIG. 5 Create/Update Storage System Profile Table

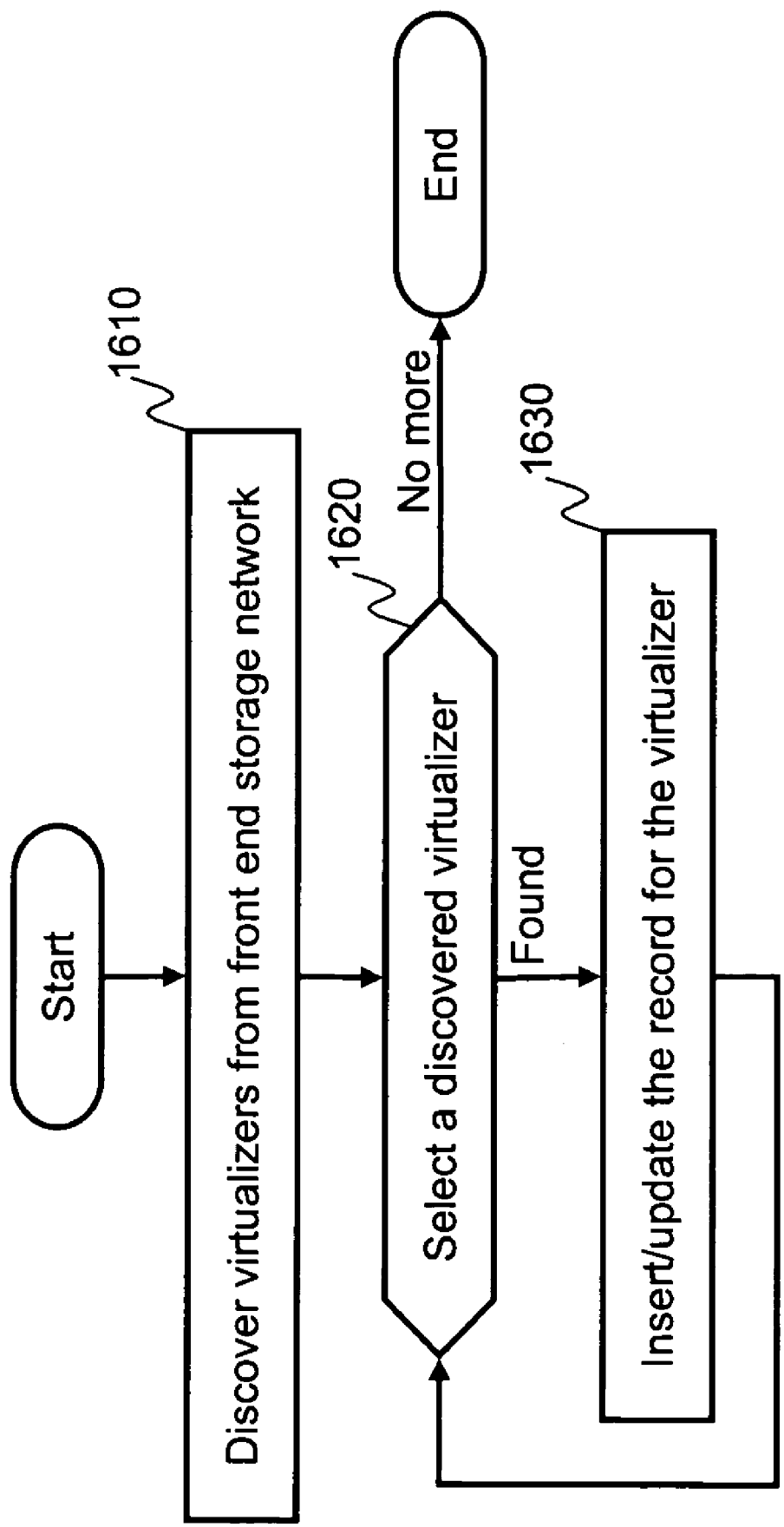
FIG. 6 Create/Update Virtualizer Profile Table

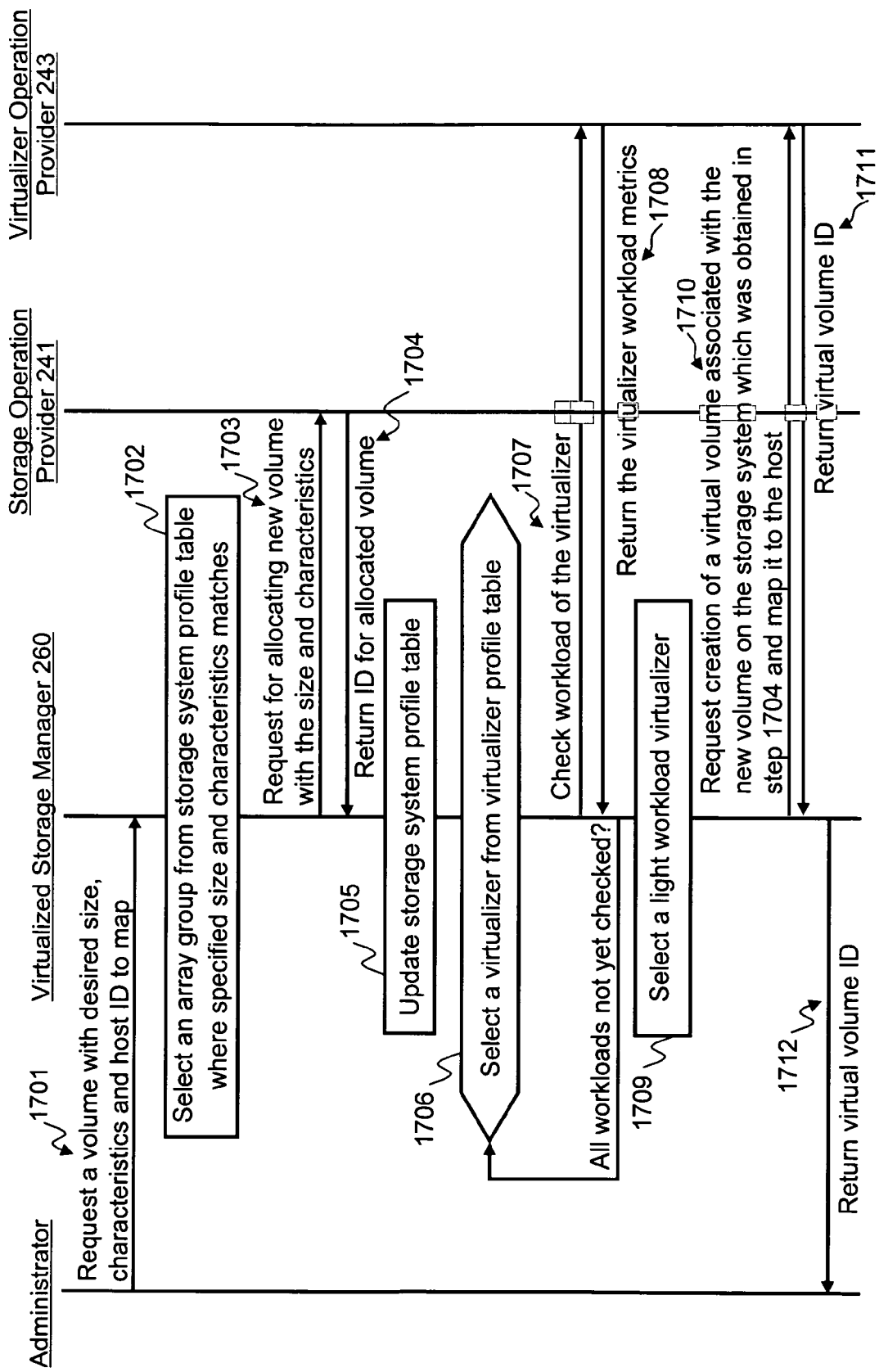
FIG. 7 Process to Allocate Storage Volume

MANAGEMENT SYSTEM FOR A VIRTUALIZED STORAGE ENVIRONMENT

BACKGROUND OF THE INVENTION

1. Field of the Invention

The present invention relates generally to storage systems, and, more particularly, to automated management and configuration of virtualized storage system environments.

2. Description of Related Art

Storage virtualization technologies are able to encapsulate underlying physical storage system structures to be presented to users in a simplified format, and are able to offer huge logical storage pools to users. The use of storage virtualization is expected to help solve current issues in mass data storage, such as extreme growth in the amount of business data or heterogeneous device management. However, at the same time, configuring a virtualized environment itself causes another level of complexity, and storage administrators may be apprehensive of managing such an intelligent but complicated environment. Therefore, there is an existing demand for an automated solution to assist administrators in configuring a virtualized storage environment.

Under common methods, storage virtualization may be achieved by inserting a device called a "virtualizer" or a "virtualization device" between host computers and storage systems. The virtualizer is able to present a virtual volume to a user, while mapping the virtual volume to one or more actual logical volumes on one or more storage systems. A virtualizer could be another array-controller type device, such as a storage controller, that has a feature to connect external storage systems to its backend ports and that represents the virtual volume associated with the storage volumes in the external storage devices as if the volumes on the external storage are a single volume existing on the front end virtualizer device. Alternatively, an intelligent switch device may be used for the virtualizer, and may also be able to encapsulate the connected respective storage systems to represent a virtual volume to users.

By using virtualizers, a storage network is separated into two parts: a first part, such as a front end domain for the network that exists between the host computers and one or more virtualizers, which represent virtual volumes to be mapped to the hosts; and a second part that is a back end domain for the network that exists between the one or more virtualizers and the one or more storage systems.

The front end network typically appears similar to a non-virtualized storage network, in which hosts are connected to storage arrays via switches, etc. However, to present a virtual volume on the virtualizer to a host, while mapping the virtual volume to an actual logical volume on a separate external storage system, the administrator also has to realize and configure the back end network, i.e., the portion of the network that exists between the virtualizers and the storage systems. The back end network portion of the virtualized storage environment is typically the part that is difficult for the administrators to configure since it adds another level of complexity to the management of the virtualized storage environment.

Furthermore in certain applications virtualizers may be arranged in a cluster-type of configuration, which provides advantages such as enabling the balancing the workloads and design architecture for avoiding single point of failure. In this case, volume mapping operations between actual storage volumes on a storage system and virtual volumes on a virtualizer somewhere in the cluster also can cause more complicated management work for administrators.

Thus, while it is known to create virtualization storage systems, there is no provision in the prior art for automating management and configuration of these systems to provide assistance to administrators. Accordingly, there is a need to relieve administrators from the difficulty of configuring a back end domain of a storage network when building a virtualized storage environment. There is also a need to automate configuration of the virtual volume allocation, and mapping of the virtual volume to the actual logical storage volumes on the storage systems when plural virtualizers are used for workload balancing.

Related art includes US Pat. App. Pub. 20050289308 to Kano, US Pat. App. Pub. 20050193167 to Eguchi et al., and US Pat. App. Pub. 20030221077 to Ohno et al., the disclosures of which are incorporated herein by reference in their entireties.

BRIEF SUMMARY OF THE INVENTION

Under one aspect, the invention is a method for allocating a storage volume in a virtualized storage environment in a system that includes one or more client hosts able to communicate with storage virtualizers and storage systems able to communicate with the storage virtualizers. A storage management server is also able to communicate with the storage systems and storage virtualizers. The storage management server gathers information from the storage systems and the storage virtualizers. When an administrator requests a volume allocation through the storage management server, the storage management server uses the gathered information to find an appropriate array group of a storage system that satisfies a specified condition, and then sends a volume allocation request to that storage system. The storage management server determines a storage virtualizer that meets predetermined criteria. The storage management server requests the storage virtualizer that meets the predetermined criteria to create a new virtual volume and map the new virtual volume to the actual newly-allocated storage volume on the storage system and also to the client host.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an exemplary data structure of a storage system profile table.

FIG. 4 illustrates an exemplary data structure of a virtualizer profile table.

FIG. 5 illustrates an exemplary process for creating/updating the storage system profile table.

FIG. 6 illustrates an exemplary process for creating/updating the virtualizer profile table.

FIG. 7 illustrates an exemplary process for allocating a storage volume.

DETAILED DESCRIPTION OF THE INVENTION

Figure 1:
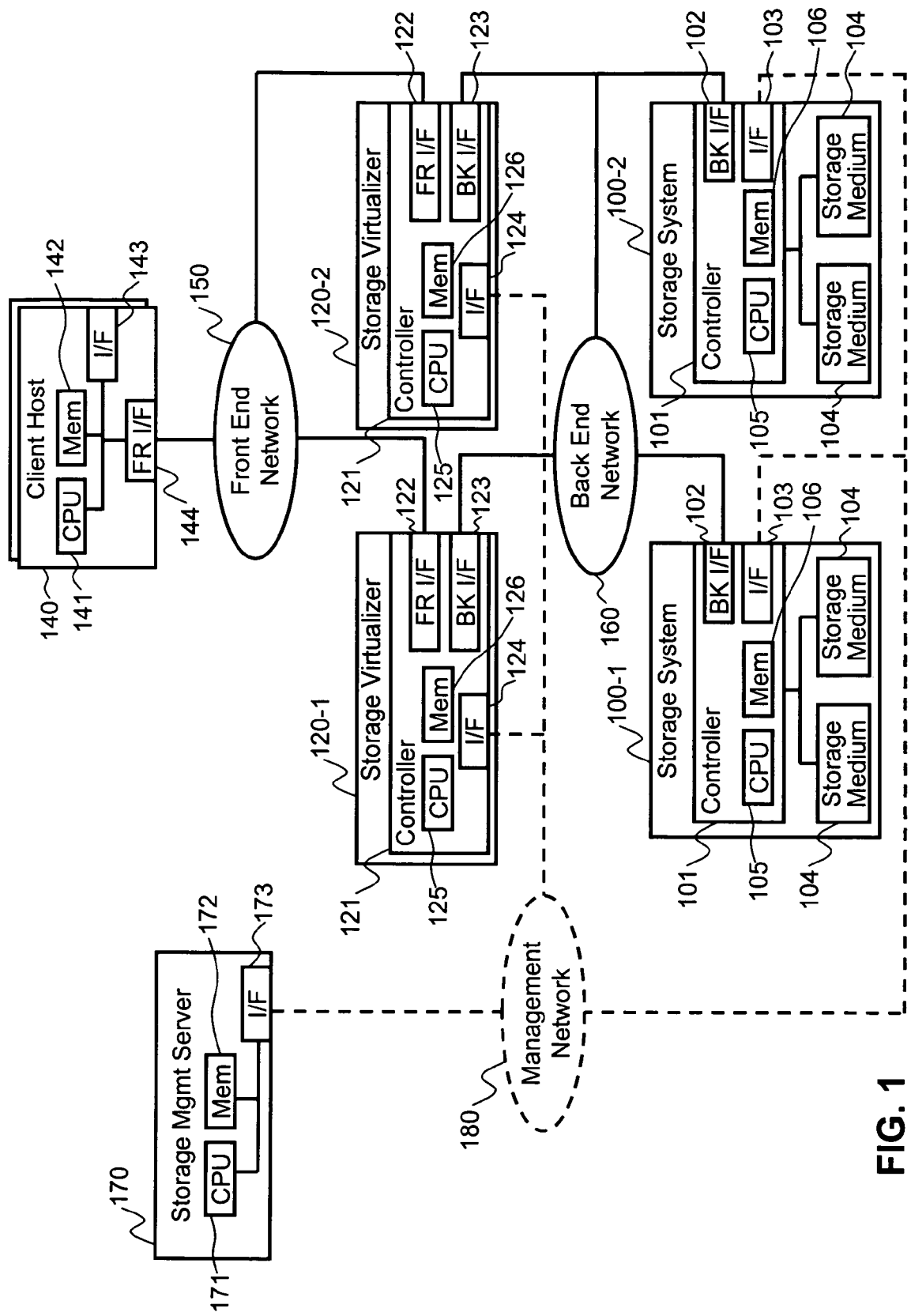
FIG. 1 illustrates an exemplary physical hardware architecture of an embodiment of the invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

FIG. 1 illustrates an example of a physical computer and storage hardware architecture in which an embodiment of the invention may be implemented. The overall system consists of one or more storage systems 100-1, 100-2, one or more storage virtualizers 120-1, 120-2, one or more client hosts 140, and a storage management server 170. Client hosts 140 and storage virtualizers 120 are able to communicate through a front end network 150. Front end network 150 is preferably a high speed Fibre Channel (FC) storage area network (SAN), but could also be any of a variety of network types, including SCSI, Ethernet, Internet, wireless, or the like. Storage virtualizers 120 are also able to communicate with storage systems 100 through a back end network 160. Back end network 160 is also preferably a high speed FC SAN, but could also be any of a variety of network types, including SCSI, Ethernet, Internet, wireless, or the like. Storage management server 170 is able to communicate with storage systems 100 and storage virtualizers 120 though a management network 180 such as a local area network (LAN) or other network type.

Each storage system 100 provides storage capacity for storing data, and includes a controller 101 and one or more storage media 104. Controller 101 may include a CPU 105 and a memory 106, which may include a cache memory for temporarily storing data. A back end network interface 102, which may be an FC port or the like, is included in controller 101 for receiving and sending data on back end network 160. A management network interface 103, such as a network interface controller (or card) (NIC) is also included within controller 101 for sending and receiving data on management network 180. Storage media 104 may be any of a variety of devices, such as hard disk drives, flash memory, optical disks, tape, and so on. Storage media 104 are connected for communication with controller 101, which controls transfer of data between storage media 104 and back end network 160.

Each storage virtualizer 120 includes a controller 121. Controller 121 includes a CPU 125 and a memory 126, which may include a cache memory for temporarily storing data. The storage virtualizer 120 may alternatively be an intelligent switch device having virtualization capability incorporated, and including functional components similar to those shown for controller 121. Controller 121 of storage virtualizer 120 includes a front end network interface 122 which may be an FC port, or the like, and which is connected to the front end network 150 to enable communication with client hosts 140. A back end network interface 123 may also be an FC port and is connected to the back end network 160 to enable communication with storage systems 100. Controller 121 also includes a management network interface 123 which may be a NIC to enable communication with management network 180.

Each client host 140 may be a generic computer that includes a CPU 141 and a memory 142. Client host 140 is able to connect to front end network 150 using a front end network interface 144, which may be either a host bus adapter (HBA) in the case of an FC network, or a NIC in the case of Ethernet, Internet protocol, or similar network. Client host may also include an additional interface 143 for communication with the management network 180 and management computer 170. Client host 140 acts as a terminal computer for the storage service user, i.e., the user that stores data in one or more of storage systems 100.

Storage management server 170 may be a generic computer server that includes a CPU 171, a memory 172, and a NIC 173. Storage management server 170 also includes a means for automating management and configuration of storage virtualization as will be described in more detail below.

Figure 2:
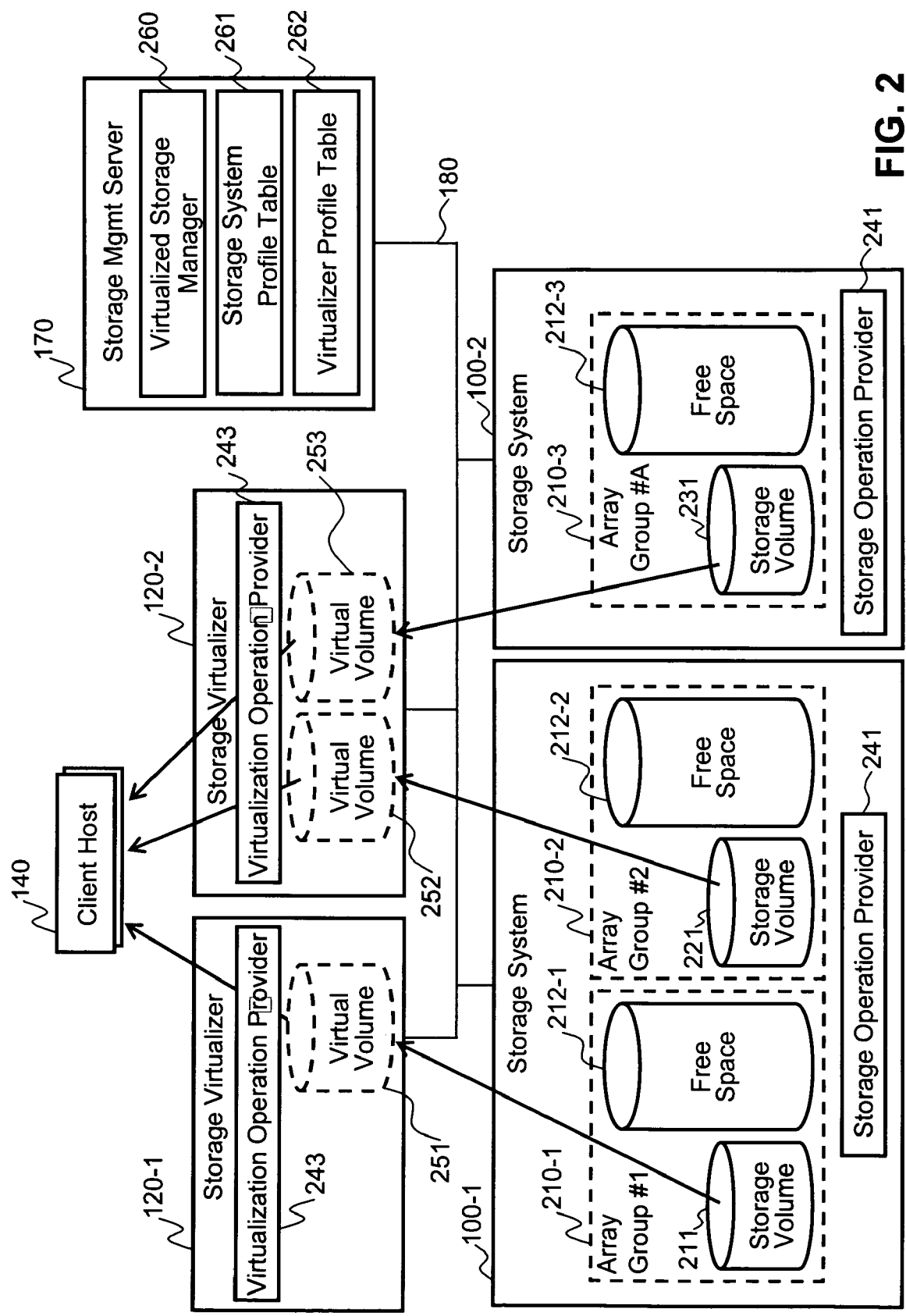
FIG. 2 illustrates an exemplary software and logical element structure of the embodiment of FIG. 1.

FIG. 2 illustrates an exemplary software and logical element structure of the invention. On each storage system 100 there is allocated at least one logical storage volume. In the present configuration, storage system 100-1 includes storage volumes 211 and 221, while storage system 100-2 includes storage volume 231. However, it should be understood that any number of storage volumes could be allocated on each storage system 100, and that the illustrated embodiment is only exemplary.

Each storage volume 211, 221, 231 is an allocated amount of data storing capacity allocated for the storage service user. A storage volume may be comprised of a variety of the types of media mentioned above, and in the case of disk drives, could be spread over a plurality of disk drives. Thus, the available capacity may be logically built by use of several storage media 104, and is not restricted to the size of any single storage medium 104. As the term "storage volume" is used here, it indicates a general capacity of storage, and is not restricted to a specific level of storage amount.

Each storage system 100 includes one or more array groups 210, each of which is a group of storage volumes that share a particular characteristic, such as the same RAID level. The array group 210 is a logical element composed of a collection of one or more physical storage media and can be thought of as the parent element of a storage volume which is generated from the array group. Each array group may also have an amount of free space 212 that indicates the remaining unused capacity available within each array group. A storage system 100 may have either a single or multiple array groups. In the example illustrated in FIG. 2, storage system 100-1 includes a first array group 210-1 having logical volume 211 allocated and having free space 212-1. Storage system 100-1 also includes a second array group 210-2 having logical volume 221 allocated and having free space 212-2. Storage system 100-2 includes only a single array group 210-3 that includes allocated logical volume 231 and free space 210-3.

Storage operation provider 241 on each storage system 100 provides a basic operation interface of storage management functionality. Storage operation provider 241 enables functions such as allocating a desired size and characteristic of a storage volume or providing a mapping configuration of the storage volumes. Storage operation provider 241 may be a program stored in memory 106, or other computer readable medium, and executed by CPU 105 on storage system 100.

Each storage virtualizer 120 is able to present one or more virtual volumes to the client hosts 140. In the example illustrated, virtualizer 120-1 presents virtual volume 251 to client host 140, while virtualizer 120-2 presents virtual volumes 252, 253 to client host 140. Each virtual volume is a logical representation to the client host 140 of the data storing capacity available to the client host. The virtual volume is associated by the virtualizer 120 with the actual storage volume on the storage system 100. For example, a single storage volume may be mapped by a single virtual volume, i.e., in the FIG. 2, logical volume 211 is mapped by virtual volume 251, logical volume 221 is mapped by virtual volume 252, and logical volume 231 is mapped by virtual volume 253. Each virtual volume will behave as if real capacity is placed on the virtual volume. The client host 140 only knows of the virtual volume but never knows (or does not need to know) of the mapped logical storage volume allocated on the storage system 100. Thus, the virtualization technology of the invention enables adding more storage capacity or replacing actual storage systems on the backend to meet increased storage needs transparently to the client host 140, to whom it will merely appear as if capacity of the virtualizer is enhanced. Further, under the virtualization technology of the invention, virtual volumes may be treated in the same manner during various operations, such as replication, backup and the like, as if in a homogenous environment, even though the actual storage systems themselves may be heterogeneous, such as from different vendors or using different storage formats.

A virtualization operation provider 243 is provided on each virtualizer 120. Virtualization operation provider 243 provides a basic operation interface for functionality of virtual storage management. Virtualization operation provider 243 enables functions such as generating a new virtual volume or providing a measure of current virtualizer workload in response to a request. Virtualization operation provider 243 may be realized as a program stored on memory 126 or on other computer readable medium, and executed by CPU 125 in virtualizer 120.

Storage management server 170 includes a virtualized storage manager 260, which is a program stored on memory 172 or other computer readable medium, and which is implemented in the present invention to automate storage virtualization configuration according to a storage volume allocation request from an administrator. Storage virtualization configuration as referred to here includes allocating an actual storage volume from an appropriate storage system 100, creating a corresponding virtual volume on an appropriate virtualizer 120, mapping the virtual volume to the actual storage volume, and mapping the virtual volume to the appropriate client host 140.

For achieving these management and configuration operations, as will be described in more detail below, storage management server 170 stores a storage system profile table 261 and a virtualizer profile table 262. Storage system profile table 261 holds records of all array group information that is disclosed from each of the storage systems 100. Storage system profile table 261 includes characteristic properties and free space size of each array group 210. Virtualizer profile table 262 includes records of virtualizer information which is disclosed from each storage virtualizer 120.

FIG. 3 illustrates an exemplary data structure of the storage system profile table 261. The storage system profile table includes the following fields:

StorageSystemID 510: Identification of the storage system. This information may be location information, such as network address of the storage system to access.

ArrayGroupID 520: Identification of the array group 210 within the storage system 100.

RAID Level 530 (and other characteristics 540): Characteristics of the array group 210, such as RAID level. Other characteristics and properties 540 of the array group may also be included, such as data retention period, specific disk layout in a RAID group, utilization ratio, and the like.

FreeSpace 550: Size of the free space available in a particular array group 210, which indicates the available storage space for allocating a new storage volume.

Rows 591, 592, 593 of storage system profile table 261 illustrate exemplary data that may be found in a the storage system profile table 261. For example, line 591 represents a record of a storage system having a StorageSystemID of "100-1" that includes an array group having an ArrayGroupID of "1", the RAID level for array group #1 is "RAID 0", and array group #1 as "8,150,238,732,578" bytes free space remaining that are available for allocating to new storage volumes. Storage system profile table 261 is generated and referred to by virtualized storage manager 260 to enable locating of an appropriate array group 210 for allocating a new storage volume based on requested characteristics and size received from an administrator. The records in storage system profile table 261 are generated by information disclosed by each storage system 100 in response to an inquiry from virtualized storage manager 260.

FIG. 4 illustrates an exemplary data structure of the virtualizer profile table 262. Virtualizer profile table 262 contains at least the VirtualizerID 610 of each virtualizer available for use and configuration by the virtualized storage manager 260. VirtualizerID 610 is used to identify each virtualizer 120 in the system, and preferably is the network address information of the virtualizer for accessing and sending inquiries to the virtualizers 120. Other information in the virtualizer profile table 262 may include the average workload 630 on the virtualizer so that this may be taken into account when selecting a virtualizer 120, although current workload may also be considered, as described in more detail below. Rows 691, 692 illustrate exemplary information that may be included in the virtualizer profile table 262. For instance, line 691 represents a record of virtualizer 120-1 in which its VirtualizerID is "Virtualizer 120-1", and its average workload is "X". The virtualizer profile table 262 is generated by virtualized storage manager 260 by sending inquiries over network 180 and by collecting information provided in response from the virtualizers 120. Virtualized storage manager 260 refers to virtualizer profile table 262 to locate existing storage virtualizers on the network when selecting an appropriate storage virtualizer 120 for requesting creation of a new virtual volume according to predetermined criteria, such as the current workload of the virtualizer and/or other criteria, such as average workload.

FIG. 5 illustrates an exemplary process for creating and/or updating the storage system profile table 261. The process is executed by the virtualized storage manager 260 and includes the following steps.

Step 1510: The process discovers all storage systems existing on the back end storage network 160. Discovery could be performed by using a common mechanism such as by using a service location protocol, for example.

Step 1520: The process selects a storage system from the results of Step 1510. If all storage systems have already been selected for processing, then the process ends.

Step 1530: The process sends a request to storage operation provider 241 of the selected storage system 100 for collecting and identifying the array groups 210 in the selected storage system 100.

Step 1540: The process selects an array group 210 from the results of Step 1530. When all array groups 210 have already been processed, the process goes back to Step 1520 for processing the next storage system 100 in the system.

Step 1550: The process sends a request to storage operation provider 241 of the storage system 100 to which the selected array group 210 belongs for obtaining properties showing characteristics of the selected array group and the free space size 212 of the selected array group.

Step 1560: The process inserts (or updates if the record for that array group already exists) a record with the values of the characteristics of the selected array group obtained in Step 1550. The process then returns to Step 1540 for processing the next array group. When all array groups 210 for all discovered storage systems 100 have been processed, the storage system profile table 261 has been created/updated, and the process ends.

FIG. 6 illustrates an exemplary process for creating and/or updating the virtualizer profile table 262. The process is executed by the virtualized storage manager 260, and includes the following steps.

Step 1610: The process discovers all storage virtualizers 120 existing on the front end storage network 150. Discovery could be performed by using a common mechanism such as a service location protocol, for example.

Step 1620: The process selects a storage virtualizer from the results obtained in Step 1610. If all storage virtualizers in the result have already been processed, then the process ends.

Step 1630: The process inserts (or updates, if the record for that storage virtualizer already exists) a record with the identifier of the storage virtualizer 120 obtained in Step 1620. If average workload has changed, those records can be updated also. The process then returns to Step 1620 for processing of the next storage virtualizer 120. When all virtualizers in the system have been processed, the process ends.

FIG. 7 illustrates an exemplary process for allocating a storage volume carried out between the administrator, the virtualized storage manager 260, the storage operation providers 241 on storage systems 100 and the virtualizer operation providers 243 on virtualizers 120. The process includes the following steps.

Step 1701: The administrator makes a request for a new storage volume to the virtualized storage manager 260, and includes a desired size, characteristics, and client host ID to which the new volume is to be mapped or otherwise made accessible.

Step 1702: The virtualized storage manager 260 selects an array group 210 from the storage system profile table 261 that meets one or more specified conditions. In the preferred embodiment, the specified condition includes at least having sufficient available free space. Other specified conditions can be that the array group conform to a particular RAID type or include other specified characteristics requested by the administrator.

Step 1703: The virtualized storage manager 260 sends a request to the storage operation provider 241 of the storage system 100 containing the selected array group 210 selected in Step 1702. The request to the storage operation provider 241 includes the requested size of the new logical volume and characteristics.

Step 1704: The storage operation provider 241 allocates a new logical volume in response to the received request and returns the volume ID for the newly-allocated storage volume to the virtualized storage manager 260.

Step 1705: Because the free space size of the array group 210 which was selected to create the newly-allocated volume will have decreased by the size of the newly-allocated volume, the virtualized storage manager 260 executes a process to update the storage system profile table, such as was described above in FIG. 5. Step 1705 could also be carried out following completion of Step 1712 below.

Step 1706: Virtualized storage manager 260 then selects a storage virtualizer from virtualizer profile table 262. The selection can be made based upon one or more predetermined criteria such as current workload and/or average workload. In the embodiment illustrated in FIG. 7, the virtualized storage manager 260 checks the current workload of each virtualizer 120 in the system for selecting the virtualizer having the lowest current workload as the predetermined criteria.

Step 1707: The virtualized storage manager 260 sends a request to the virtualization operation provider 243 on the selected virtualizer 120 to check the current workload of the selected storage virtualizer 120. There are several metrics that may be used to measure the workload of the storage virtualizer 120, and the invention is not limited to a particular metric or any particular combination. One metric of particular use is port IOPS (input/output operations per second) which is a measure of the total input and output operations conducted per second on the ports of the virtualizer. Other metrics may include cache availability, errors on the virtual volume, and the like.

Step 1708: Virtualization operation provider 243 on the storage virtualizer returns the requested metric to the virtualized storage manager 260. The virtualized storage manager 260 retains the obtained metric values, and then repeats steps 1706 and 1707 until the workloads on all virtualizers have been check. When all of the workloads have been checked, the process proceeds to Step 1709. In an alternative embodiment, rather than checking current workloads at the time the volume is to be created, workloads may be collected over a period of time, and an average workload obtained. This average workload may then be used as a consideration in determining which virtualizer to select.

Step 1709: Based on the results obtained in Steps 1706 through 1708, the virtualized storage manager 260 selects a storage virtualizer having the lightest current workload, or a virtualizer having a current workload that is below a predefined criteria and/or that otherwise meets the predetermined considerations discussed above, such as average historic workload, and the like.

Step 1710: Virtualized storage manager 260 sends a request to virtualization operation provider 243 on the storage virtualizer 120 that was selected in Step 1709 to request the creation of a new virtual volume and to map the new virtual volume to the newly-allocated storage volume which was created in Steps 1703 and 1704 on the storage system. The request also provides information for mapping the virtual volume to one or more client hosts 140, or for otherwise making the virtual volume accessible to the one or more client hosts 140 specified by the administrator in the administrator's original request in Step 1701.

Step 1711: A virtual volume ID for the created and mapped virtual volume is returned by the virtualizer operation provider 243 to the virtualized storage manager 260.

Step 1712: Virtualized storage manager 260 returns the obtained virtual volume ID to the administrator, and the process is complete.

From the foregoing, it will be apparent that the invention is useful for storage management and configuration in systems where storage virtualization technologies are adopted. The invention automates the gathering and organizing of respective storage system information and virtualizer information, and automates allocation of new storage volumes, mapping between the actual storage volume and a virtual volume, and also the mapping between the virtual volume and the client host. Further, in the case in which there are plural virtualizers, the invention determines their relative workloads or considers other properties of the virtualizers and requests the creation of the virtual volume on the appropriate virtualizer. The invention can be applied to systems using either array-based virtualizers or an intelligent switch-based virtualizers.

Thus, it may be seen that the invention relieves administrators from struggling to configure a back end domain storage network to build a virtualized environment. Also, the invention automates configuration of the virtual volume allocation and mapping to the actual storage volume on the storage system when plural virtualizers are available for workload balancing so that the virtual volume will be allocated to a virtualizer to achieve certain considerations, such as better balancing the total workload of the virtualizers. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of allocating a storage volume to a host computer in a system including a plurality of storage systems able to communicate with a plurality of storage virtualizers via a first network, said storage virtualizers being able to communicate with said host computer via a second network, and a management computer able to communicate with said storage systems and said storage virtualizers via a third network, the method comprising:
   collecting, by the management computer, storage system information on the storage systems in the system and array groups available for each storage system, including available storage space in each array group;
   collecting by the management computer virtualizer information on the virtualizers in the system;
   receiving at the management computer an instruction for a storage volume of a specified size to be allocated to the host computer;
   selecting, by the management computer, a first array group out of said array groups on said storage systems for which said information was collected;
   requesting that a logical volume be allocated for the specified size in said first array group selected by the management computer;
   sending a request by the management computer to each virtualizer in the system to determine a virtualizer out of said virtualizers having a lightest current workload; and
   requesting that the virtualizer having the lightest current workload create a virtual volume mapping to said logical volume and accessible by said host computer.

2. The method of claim 1, wherein
   said step of collecting storage system information from said storage systems includes collecting information on RAID characteristics of each array group; and
   said step of selecting the array group includes selecting the array group that meets specified RAID characteristic included with said instruction for the storage volume received by said management computer.

3. The method of claim 1 further including a step of determining the virtualizer out of said virtualizers having the lightest current workload by comparing a number of input and output operations per second for ports of each virtualizer.

4. The method of claim 1 further including steps of
   receiving, by the management computer, a logical volume ID from the storage system in which the logical volume was allocated;
   including the logical volume ID with the request to the virtualizer for creating the virtual volume; and
   receiving by the management computer a virtual volume ID of the virtual volume created by the virtualizer.

5. The method of claim 1, further including steps of
   providing a first Fibre Channel network as said first network;
   providing a second Fibre Channel network as said second network separate from said first network; and
   providing a local area network as said third network separate from said first and second networks.

6. The method of claim 1, further including a step of
   providing a plurality of intelligent switches or storage controllers as said storage virtualizers, each including a CPU and a memory for presenting the virtual volume to the host computer.

7. A system comprising:
   a host computer;
   a management computer;
   a plurality of storage virtualizers, each configured to present a virtual volume to the host computer, said virtual volume mapping to a logical volume on a storage system, each said virtualizer including a front end interface for communicating with the host computer, a management interface for communicating with the management computer, and a back end interface; and
   one or more said storage systems, each said storage system including storage media for storing data and a storage controller for controlling transfer of data to and from the storage media, each said storage controller including a back end interface for communicating with the storage virtualizers and a management interface for communicating with the management computer,
   wherein each said storage controller has one or more array groups implemented thereon and is configured to allocate a logical volume with one of said array groups,
   wherein, said management computer is configured to determine an array out of said one or more array groups that meets a specified condition for allocating a logical volume in response to a request to allocate a logical volume to the host computer, and
   wherein said management computer is further configured to determine a first virtualizer out of said virtualizers that meets predetermined criteria, and request that the first virtualizer create a virtual volume mapped to the logical volume and to the host computer.

8. The system of claim 7 further including:
   a first network connecting said management computer for communication with said storage virtualizers and said storage systems;
   a second network connecting said storage systems to said virtualizers for enabling transfer of data between said storage systems and said virtualizers; and
   a third network connecting said virtualizers and said host computer for enabling transfer of data between said virtualizers and said host computer.

9. The system of claim 7, wherein
   said management computer is configured to determine which virtualizer of said virtualizers has the lightest current workload by collecting current workload information from each of the virtualizers in communication with the management computer when determining which virtualizer meets the predetermined criteria.

10. The system of claim 7, wherein
    said management computer is configured to collect information from said storage systems to determine available capacity of the array groups present on each storage system in communication with the management computer and to determine RAID type of each array group for use in selecting an array group that meets the predetermined condition.

11. The system of claim 10, wherein
said management computer is further configured to update the information collected from said storage systems for the available capacity of the array groups following allocation of the logical volume.

12. The system of claim 7, wherein
said storage virtualizers are intelligent switches or storage controllers, each including a CPU and a memory for presenting the virtual volume to the host computer.

13. The system of claim 7, wherein
said management computer is configured to determine which virtualizer of said virtualizers has a lowest average workload when determining which virtualizer meets the predetermined criteria.

14. A method of allocating a storage volume to a host computer in a system including one or more storage systems able to communicate with a plurality of storage virtualizers, said storage virtualizers being able to communicate with said host computer, and a management computer able to communicate with said storage systems and said storage virtualizers, the method comprising:
receiving a request for allocation of a storage volume meeting a specified condition;
selecting an array group out of a plurality of array groups on said one or more storage systems able to satisfy the specified condition;
requesting that a logical volume be allocated in said array group selected according to the specified condition;
determining a first virtualizer out of said virtualizers meeting a predetermined performance criteria; and
requesting that said first virtualizer create a virtual volume mapping to said logical volume and accessible by said host computer.

15. The method of claim 14, wherein
the specified condition includes a volume storage capacity, and
said step of selecting an array group includes a step of selecting an array group having sufficient free space to accommodate the specified volume storage capacity.

16. The method of claim 14, wherein
said step of determining a first virtualizer out of said virtualizers meeting a predetermined performance criteria includes a step of determining that the first virtualizer of said virtualizers has a lightest current workload by collecting current workload information from each of the virtualizers in communication with the management computer.

17. The method of claim 14, wherein
said step of determining a first virtualizer out of said virtualizers meeting a predetermined performance criteria includes a step of determining that the first virtualizer of said virtualizers has a lowest average workload.

18. The method of claim 14, further including a step of
collecting information from said storage systems to determine available capacity of the array groups present on each storage system in communication with the management computer and to determine RAID type of each array group.

19. The method of claim 18, further including a step of
updating the information collected from said storage systems for the available capacity of the array groups following allocation of the logical volume.

20. The method of claim 14, further including a step of
providing a plurality of intelligent switches or storage controllers as said storage virtualizers, each including a CPU and a memory for presenting the virtual volume to the host computer.

* * * * *